United States Patent
Basu et al.

(10) Patent No.: US 8,953,902 B2
(45) Date of Patent: Feb. 10, 2015

(54) SYSTEMS AND METHODS FOR THIN OBJECT IMAGING

(75) Inventors: Samit Kumar Basu, Fremont, CA (US); Todd Jason Gable, Newark, CA (US)

(73) Assignee: Morpho Detection, LLC, Newark, CA (US)

( * ) Notice: Subject to any disclaimer, the term of this patent is extended or adjusted under 35 U.S.C. 154(b) by 0 days.

(21) Appl. No.: 13/542,697

(22) Filed: Jul. 6, 2012

(65) Prior Publication Data
US 2014/0010473 A1 Jan. 9, 2014

(51) Int. Cl.
*G06K 9/40* (2006.01)
(52) U.S. Cl.
USPC .......................................................... 382/264
(58) Field of Classification Search
None
See application file for complete search history.

(56) References Cited

U.S. PATENT DOCUMENTS

| | | | | |
|---|---|---|---|---|
| 5,712,926 A | * | 1/1998 | Eberhard et al. | 382/205 |
| 6,049,623 A | * | 4/2000 | Fuderer et al. | 382/131 |
| 6,108,396 A | * | 8/2000 | Bechwati et al. | 378/4 |
| 6,317,509 B1 | * | 11/2001 | Simanovsky et al. | 382/131 |
| 6,343,158 B1 | * | 1/2002 | Shiohara | 382/261 |
| 7,609,870 B2 | * | 10/2009 | Li | 382/131 |
| 7,650,023 B2 | * | 1/2010 | Fischer et al. | 382/128 |
| 7,809,178 B2 | * | 10/2010 | Spies et al. | 382/131 |
| 2004/0081340 A1 | * | 4/2004 | Hashimoto | 382/128 |
| 2004/0264625 A1 | | 12/2004 | Basu et al. | |
| 2005/0180541 A1 | | 8/2005 | Avinash et al. | |
| 2005/0249416 A1 | | 11/2005 | Leue et al. | |
| 2008/0123895 A1 | * | 5/2008 | Gable et al. | 382/100 |
| 2008/0123912 A1 | * | 5/2008 | Lal et al. | 382/128 |
| 2009/0074129 A1 | | 3/2009 | Kohler et al. | |
| 2009/0169051 A1 | * | 7/2009 | Ioannou et al. | 382/100 |
| 2009/0169079 A1 | * | 7/2009 | Garms | 382/131 |
| 2009/0169081 A1 | | 7/2009 | Garms | |
| 2010/0061610 A1 | | 3/2010 | Van De Haar | |
| 2010/0295689 A1 | * | 11/2010 | Armistead et al. | 340/600 |
| 2011/0268328 A1 | * | 11/2011 | Bar-Aviv et al. | 382/128 |

* cited by examiner

*Primary Examiner* — Vu Le
*Assistant Examiner* — Alexander J Lesnick
(74) *Attorney, Agent, or Firm* — Armstrong Teasdale LLP

(57) ABSTRACT

A method for imaging an object is provided. The method includes acquiring image data of the object, wherein the image data includes a plurality of original voxels each having an original CT number, identifying, using a processing device, a subset of the original voxels based on at least one of an original CT number and a location of each original voxel, applying, using the processing device, an anisotropic smoothing filter to the identified original voxels in the subset to generate a set of smoothed voxels each having a smoothed CT number, generating, using the processing device, smoothed image data by combining the original voxels and the smoothed voxels, and analyzing the smoothed image data to determine whether the object contains contraband.

14 Claims, 5 Drawing Sheets

SYSTEMS AND METHODS FOR THIN OBJECT IMAGING

BACKGROUND OF THE INVENTION

The embodiments described herein relate generally to X-ray computed tomography and, more particularly, to imaging thin objects using X-ray computed tomography.

In at least some known computed tomography ("CT") imaging systems, an X-ray source projects a fan-shaped or a cone-shaped beam towards an object to be imaged. The X-ray beam passes through the object, and, after being attenuated by the object, impinges upon an array of radiation detectors. Each radiation detector produces a separate electrical signal that is a measurement of the beam intensity at the detector location. During data acquisition, a gantry that includes the X-ray source and the radiation detectors rotates around the object.

In restricted areas such as airports and correctional facilities, detecting contraband (e.g., explosives, drugs, weapons, etc.) in objects is a high priority. At least some known contraband detection systems utilize CT technology to produce CT images and detect contraband in objects such as luggage, packages, containers, etc. CT volume scanners acquire a plurality of cross-sectional CT slices of an object at regular, closely spaced intervals so that the entire volume of the object is imaged. Each pixel in each CT slice therefore represents a volume, and is referred to as a voxel. The value, or CT number, of each voxel represents an approximation of the density of the material within the voxel. Each voxel represents X-ray attenuation and is related to object density and effective atomic number. Many volume scanners employ multiple rows of detectors arranged in an array, and the object is moved continuously through the gantry while the gantry rotates. Once the object is imaged, the generated image may be analyzed to determine whether the object contains contraband.

At least some known CT scanners can accurately produce CT numbers for large objects. However, as objects become smaller and/or thinner, the accuracy of the CT number may decrease, as the accuracy of the CT number is limited by the spatial resolution of the scanner and the size of the pixels or voxels. Accordingly, when imaging relatively thin objects, the image data acquired using at least some known CT scanners is relatively noisy and can lead to poor segmentation. Further, physical distortions such as nonlinear particular volume, beam hardening, Rayleigh scatter, and other effects may impair the quality of the generated images. Therefore, at least some known CT systems are unable to clearly and accurately image thin objects, increasing the difficulty of identifying contraband in such objects.

BRIEF SUMMARY OF THE INVENTION

In one aspect, a method for imaging an object is provided. The method includes acquiring image data of the object, wherein the image data includes a plurality of original voxels each having an original CT number, identifying, using a processing device, a subset of the original voxels based on at least one of an original CT number and a location of each original voxel, applying, using the processing device, an anisotropic smoothing filter to the identified original voxels in the subset to generate a set of smoothed voxels each having a smoothed CT number, generating, using the processing device, smoothed image data by combining the original voxels and the smoothed voxels, and analyzing the smoothed image data to determine whether the object contains contraband.

In another aspect, a security scanner for imaging an object is provided. The security scanner includes an X-ray emitter configured to emit X-ray beams that passes through the object, a detector array configured to acquire raw data by detecting the X-ray beams emitted by the X-ray emitter, an image reconstructor configured to generate image data of the object from the raw data, the image data including a plurality of original voxels, and a processing device. The processing device is configured to identify a subset of the original voxels in the image data based on at least one of an original CT number and a location of each original voxel, apply an anisotropic smoothing filter to the identified original voxels in the subset to generate a set of smoothed voxels each having a smoothed CT number, and generate smoothed image data by combining the original voxels and the smoothed voxels.

In yet another aspect, a processing device is provided. The processing device is configured to receive image data of an object, wherein the image data includes a plurality of original voxels, identify a subset of the original voxels in the image data based on at least one of an original CT number and a location of each original voxel, apply an anisotropic smoothing filter to the identified original voxels in the subset to generate a set of smoothed voxels each having a smoothed CT number, generate smoothed image data by combining the original voxels and the smoothed voxels, and analyze the smoothed image data to determine whether the object contains contraband.

DETAILED DESCRIPTION OF THE INVENTION

The systems and methods described herein enable imaging of thin objects. Original image data of an object, such as a piece of luggage or a package, is acquired. The original image data includes a plurality of original voxels. At least some of the original voxels are smoothed in an x-y plane to generate a set of corresponding smoothed voxels. To generate smoothed image data, at least some of the original voxels are replaced with the smoothed voxels. By smoothing and replacing original voxels, noise in the image data may be reduced and segmentation of the image of the object may be improved. The smoothed image data may be analyzed and/or displayed to determine whether the imaged object includes any contraband. As used herein, the term "contraband" refers to illegal substances, explosives, narcotics, weapons, a threat object, and/or any other material that a person is not allowed to possess in a restricted area, such as an airport or a correctional facility.

Figure 1:
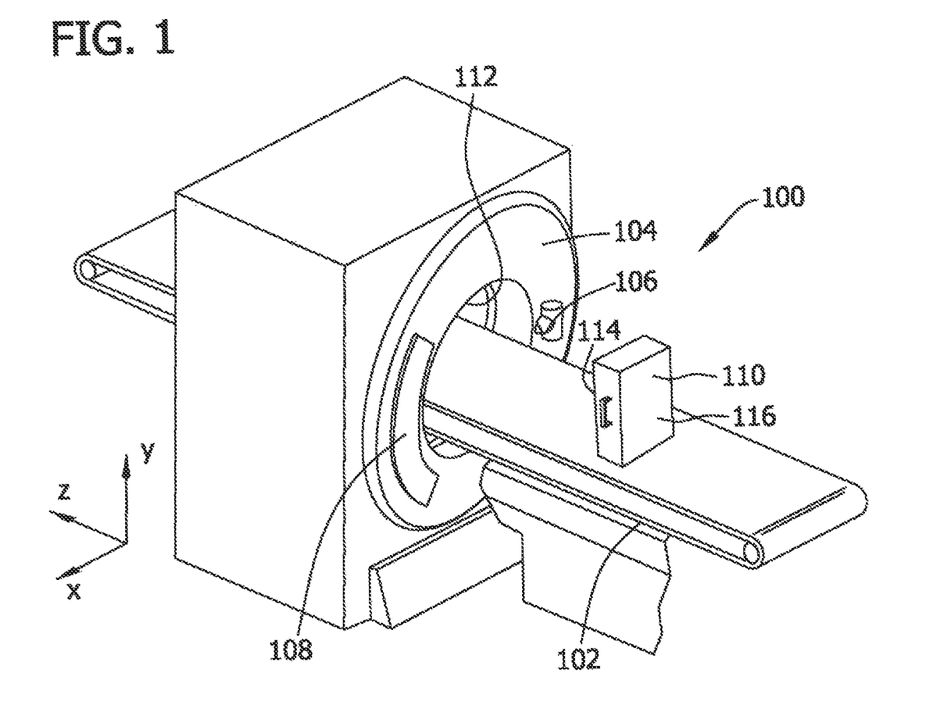
FIG. 1 is a perspective view of an exemplary computed tomography system.

FIG. 1 is a perspective view of a computed tomography (CT) system 100. CT system 100 may be used to detect contraband, and accordingly, is also referred to herein as a security scanner. CT system 100 may be implemented in various environments. For example, CT system 100 may be utilized in a correctional facility to scan objects entering and/or leaving the facility for contraband. In another example, CT system 100 may be used to at border crossings to scan packages for drugs and other smuggled items. In yet another example, CT system 100 may be used in airport security to scan luggage for contraband.

In the exemplary embodiment, CT system 100 includes a conveyor 102 and a gantry 104. Gantry 104 includes an emitter 106 (e.g., an X-ray emitter), a detector array 108, and a gantry tunnel 112. In operation, conveyor 102 moves such that when an object 110 is placed on conveyor 102, conveyor 102 moves the item through gantry tunnel 112 and past gantry 104. During operation, a leading face 114 of object 110 enters gantry tunnel 112 first, and a trailing face 116 of object 110 enters gantry tunnel last.

The direction along which object 110 moves through gantry tunnel 112 is referred to herein as the z-direction, the horizontal direction orthogonal to the z-direction is referred to herein as the x-direction, and the vertical direction orthogonal to the x-direction and the z-direction is referred to herein as the y-direction. In the exemplary embodiment, object 110 is a vertical thin object. As used herein, a "vertical thin object" refers to an object that is relatively narrow in the z-direction but has a relatively large surface area in x-y planes orthogonal to the z-direction. X-y planes orthogonal to the z-direction are also referred to herein as slice planes. Accordingly, a vertical thin object refers to an object that is relatively narrow in a direction perpendicular to a slice plane. Alternatively, object 110 may have any shape and/or dimensions that enable CT system 100 to function as described herein.

To image object 110, X-ray emitter 106 and detector array 108 are rotated with gantry 104 in an x-y imaging plane that is orthogonal to the z-direction. Gantry 104 is rotated around object 110 such that an angle, or view, at which an X-ray beam intersects object 110 constantly changes. As object 110 passes through gantry 104, gantry 104 gathers X-ray intensity data (also referred to herein as raw data) acquired from detectors in detector array 108 for each view. In the exemplary embodiment, the angular difference between adjacent views is approximately 0.25 degrees. Thus, there are approximately 1440 views in a full rotation of gantry 104. Alternatively, the views may be spaced at any interval that enables CT system 100 to function as described herein.

Figure 2:
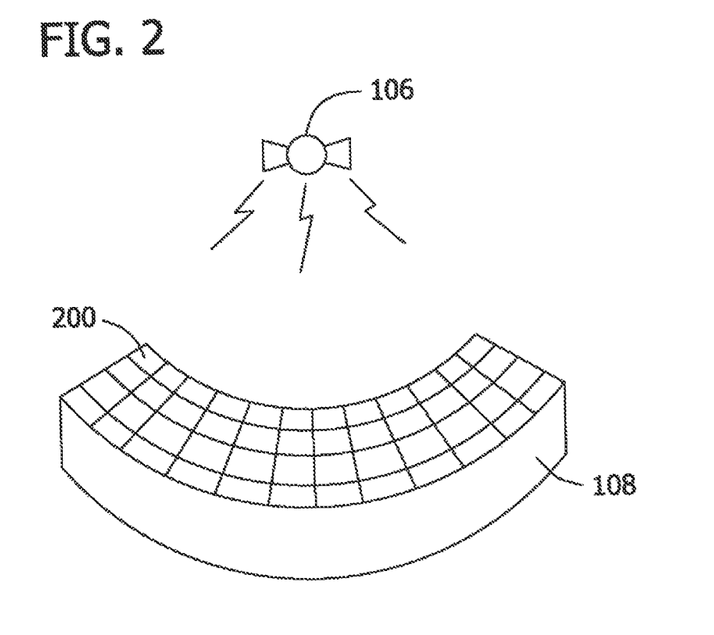
FIG. 2 is a perspective view of an exemplary emitter and detector array that may be used with the computed tomography system shown in FIG. 1.

FIG. 2 is a perspective view of an exemplary emitter 106 and detector array 108 that may be used with CT system 100 (shown in FIG. 1). Emitter 106 emits X-rays that detector array 108 is configured to detect. The operating principles of emitter 106 and detector array 108 will not be discussed in detail herein. Detector array 108 has a plurality of detectors 200. For example, in some embodiments, detector array 108 has thousands of detectors 200. For clarity, a relatively small number of detectors 200 are shown in FIG. 2.

Figure 3:
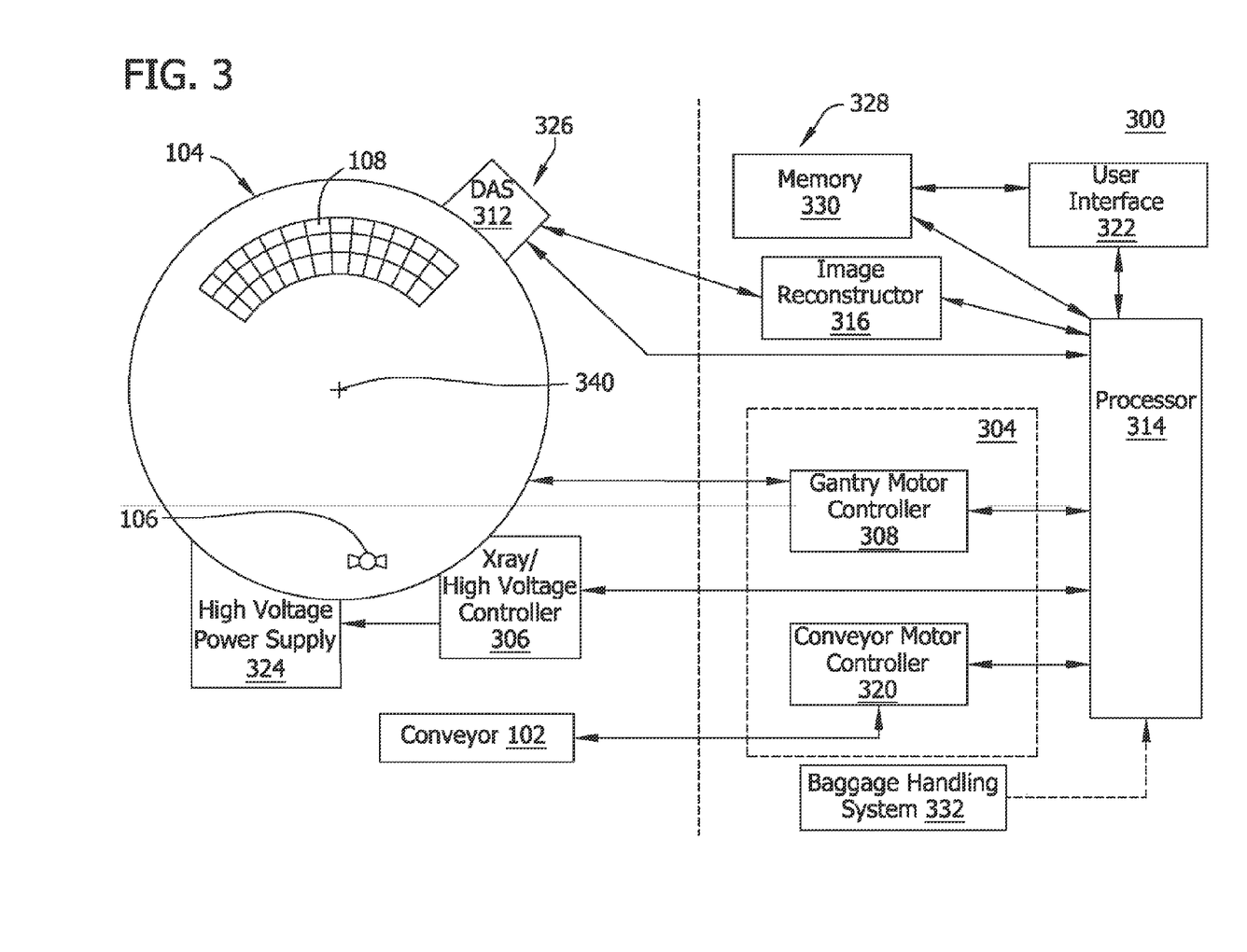
FIG. 3 is a block diagram of an exemplary electronics architecture that may be used with the computed tomography system shown in FIG. 1.

FIG. 3 depicts a block diagram of an electronics architecture 300 that may be used with CT system 100 (shown in FIG. 1). Electronics architecture 300 is separated into moving components 326 and stationary components 328.

Moving components 326 include gantry 104, conveyor 102, an X-ray/high voltage controller 306, a data acquisition system ("DAS") 312, and a high voltage power supply 324. DAS 312, X-ray/high voltage controller 306, and high voltage power supply 324 are secured to (and rotate in unison with) gantry 104 in the exemplary embodiment.

Stationary components 328 include a control mechanism 304, a processor 314, a user interface 322, memory 330, an image reconstructor 316, and a baggage handling system 332. Control mechanism 304 includes a gantry motor controller 308 and a conveyor motor controller 320. Although image reconstructor 316 and processor 314 are shown as separate components in FIG. 3, in some embodiments, image reconstructor 316 may be incorporated as part of processor 314.

Processor 314 may include one or more processing units (e.g., in a multi-core configuration). Further, processor 314 may be implemented using one or more heterogeneous processor systems in which a main processor is present with secondary processors on a single chip. As another illustrative example, processor 314 may be a symmetric multi-processor system containing multiple processors of the same type. Further, processor 314 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory 330 is one or more devices that enable information such as executable instructions and/or other data to be stored and retrieved. Memory 330 may include one or more computer readable media, such as, without limitation, dynamic random access memory (DRAM), static random access memory (SRAM), a solid state disk, and/or a hard disk. Memory 330 may be configured to store, without limitation, application source code, application object code, source code portions of interest, object code portions of interest, configuration data, execution events and/or any other type of data. In some embodiments, executable instructions are stored in memory 330. Processor 314 is programmed to perform one or more operations described herein. For example, processor 314 may be programmed by encoding an operation as one or more executable instructions and by providing the executable instructions in memory 330.

Gantry 104 includes emitter 106 and detector array 108. Each detector 200 (shown in FIG. 2) in detector array 108 produces an electrical signal that represents the intensity of an impinging X-ray beam and hence allows estimation of the attenuation of the beam as it passes through object 110. During a scan to acquire X-ray projection data, gantry 104 and the components mounted thereon rotate about a center of rotation 340. X-ray/high voltage controller 306 provides power to X-ray emitter 106, gantry motor controller 308 controls the rotational speed and position of gantry 104, and conveyor motor controller 320 controls the operation of conveyor 102.

DAS 312 samples analog data from detector array 108 and converts the data to digital signals for subsequent processing. Accordingly, raw data is acquired for object 110 while object 110 passes through gantry tunnel 112. Image reconstructor 316 receives the raw data from DAS 312 and performs high-speed image reconstruction to generate image data from the raw data. In the exemplary embodiment, the image data is generated using filtered back-projection methods. Alternatively, the image data may be generated using any suitable image reconstruction method.

In the exemplary embodiment, the image data is a plurality of voxels that form a three-dimensional image of object 110. Each voxel represents X-ray attenuation and is related to density and effective atomic number. Specifically, each voxel has a CT number that represents an approximate density of the material within the voxel. In the exemplary embodiment, the CT numbers are in Hounsfield units. Processor 314 processes the image data, as described in detail below.

Figure 4:
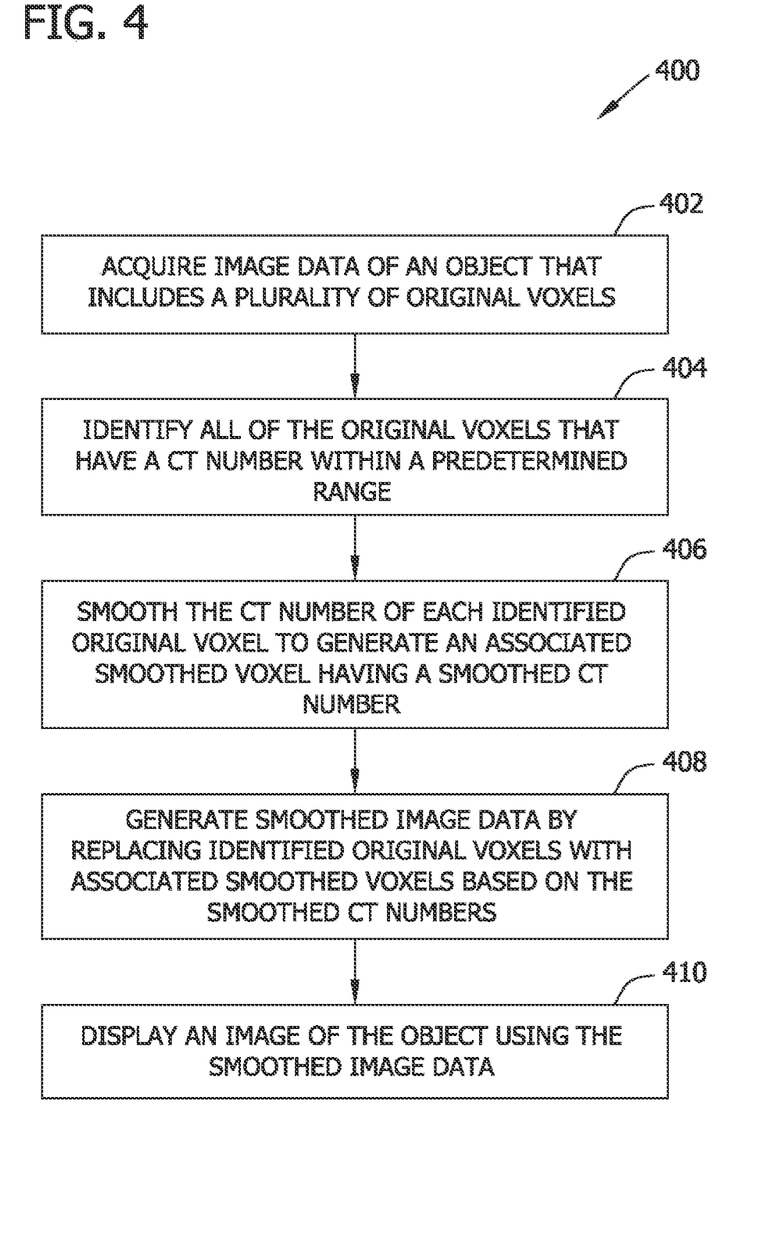
FIG. 4 is a flowchart of an exemplary method for imaging an object that may be used with the computed tomography system shown in FIG. 1.

FIG. 4 is a flowchart of an exemplary method 400 for imaging an object, such as object 110 (shown in FIG. 1). Image data including a plurality of original voxels is acquired 402 for the object, where each original voxel in the image data has an associated original CT number. The image data may be acquired 402 using an X-ray CT system, such as CT system 100 (shown in FIG. 1).

Original voxels having an original CT number within a predetermined range of original CT numbers are identified 404 by a processing device, such as processor 314 (shown in FIG. 3). In the exemplary embodiment, all of the original voxels in the image data having an original CT number within the predetermined range are identified 404. In some embodiments, identified 404 original voxels may satisfy more stringent criteria. For example, in one embodiment, original voxels in the image data having an original CT number within the predetermined range and greater than the original CT numbers of adjacent voxels in the z-direction are identified 404.

In some embodiments, only a subset of the original voxels in the image data may be subjected to the identification 404. For example, in one embodiment, the processing device may only identify 404 original voxels on a leading face and/or trailing face of the object. In another embodiment, the processing device may only identify 404 original voxels in a region of the object that is selected by a user using, for example, user interface 322 (shown in FIG. 2).

The processing device smoothes 406 the original CT number of each identified original voxel to generate an associated smoothed voxel with a smoothed CT number. In the exemplary embodiment, smoothed voxels are obtained by applying an anisotropic (i.e., directionally dependent) filter to each identified original voxel. More specifically, in the exemplary embodiment, the original CT number of a particular original voxel is smoothed by calculating the smoothed CT number as the average, or mean, of the original CT numbers of a set of original voxels in the same x-y plane as the particular original voxel. In one example, the smoothed CT number is equal to the mean CT number of original voxels in an N×N (e.g., 2×2, 3×3, etc.) neighborhood surrounding the particular original voxel. In another example, the smoothed CT number is equal to the mean CT number of the N closest original voxels in the +x direction and the N closest original voxels in the −x direction. In yet another example, the smoothed CT number is equal to the mean CT number of the N closest original voxels in the +y direction and the N closest original voxels in the −y direction.

While in the exemplary embodiment, the smoothed CT number of a particular original voxel is calculated using the mean CT number of a set of original voxels in the same x-y plane as the particular original voxel, the smoothed CT number may be calculated using other methods. For example, in some embodiments, a median or mode of the CT numbers of the set of original voxels may be used to calculate the smoothed CT number. In other embodiments, the CT numbers of the set of original voxels may be fit to a function and the smoothed CT number may be set as one or more of the parameters of the function. For example, the smoothed CT number may be calculated by fitting the CT numbers of the set of original voxels to a Gaussian function, and setting the smoothed CT number as the height of the Gaussian function. Moreover, in at least some embodiments, to improve segmentation and/or detection, the particular parameter calculated from the set of original voxels (e.g., the mean, median, or mode of the set of original voxels) is scaled (i.e., multiplied) by a constant greater than 1 to boost the smoothed CT numbers. In one embodiment, the parameter is scaled by a factor of 1.2.

Because the smoothed CT number is calculated from a set of original voxels in the same x-y plane as the particular voxel for which the smoothed CT number is being calculated, components of the object that do not have a relatively significant footprint in x-y planes are smoothed out of the image data. That is, using an anisotropic smoothing filter, only objects that have a relatively significant footprint in the x-y plane (i.e., that extend substantially in the x-y plane) survive the filtering process.

After smoothing 406 the CT number of each original voxel, smoothed image data is generated 408 by replacing identified original voxels with associated smoothed voxels based on the smoothed CT numbers, as described in detail below. By smoothing 406 the CT number of each original voxel and generating 408 smoothed image data, noise in the image data is reduced when the object is a vertical thin object.

Using the smoothed image data, an image of the object is displayed 410 on a display device. In the exemplary embodiment, the display device is part of user interface 322 (shown in FIG. 3), and may include, for example, a cathode ray tube (CRT), a liquid crystal display (LCD), an organic LED (OLED) display, and/or an "electronic ink" display.

Using CT scanner 100 (shown in FIG. 1), the smoothed image data may be analyzed to determine whether object 110 (shown in FIG. 1) contains contraband (e.g., explosives, drugs, weapons, etc.). For example, processor 314 (shown in FIG. 3) may perform one or more image analysis operations on the smoothed image data and/or an operator may visually inspect the displayed image of object 110 for contraband. In one embodiment, processor 314 determines whether object 110 includes contraband by analyzing an intensity of voxels in the smoothed image data. For example, processor 314 may compare a mean voxel value of the smoothed image data to a threshold value to determine whether object 110 includes contraband. In another embodiment, processor 314 may be configured to identify predetermined shapes (e.g., sharp items indicative of blades) in the smoothed image data to determine whether object 110 includes contraband. Alternatively, processor 314 may use other suitable methods to determine whether object 110 includes contraband.

If processor 314 determines that object 110 potentially includes contraband, processor 314 may generate an alert. The alert may include any audio and/or visual indication that notifies an operator of the potential presence of contraband. For example, the alert may include at least one of a sound generated by processor 314 and/or an icon, symbol, and/or message displayed on user interface 322 (shown in FIG. 3). Upon observing the alert, the operator may take appropriate action, such as seizing object 110 and/or detaining an owner of object 110.

Figure 5:
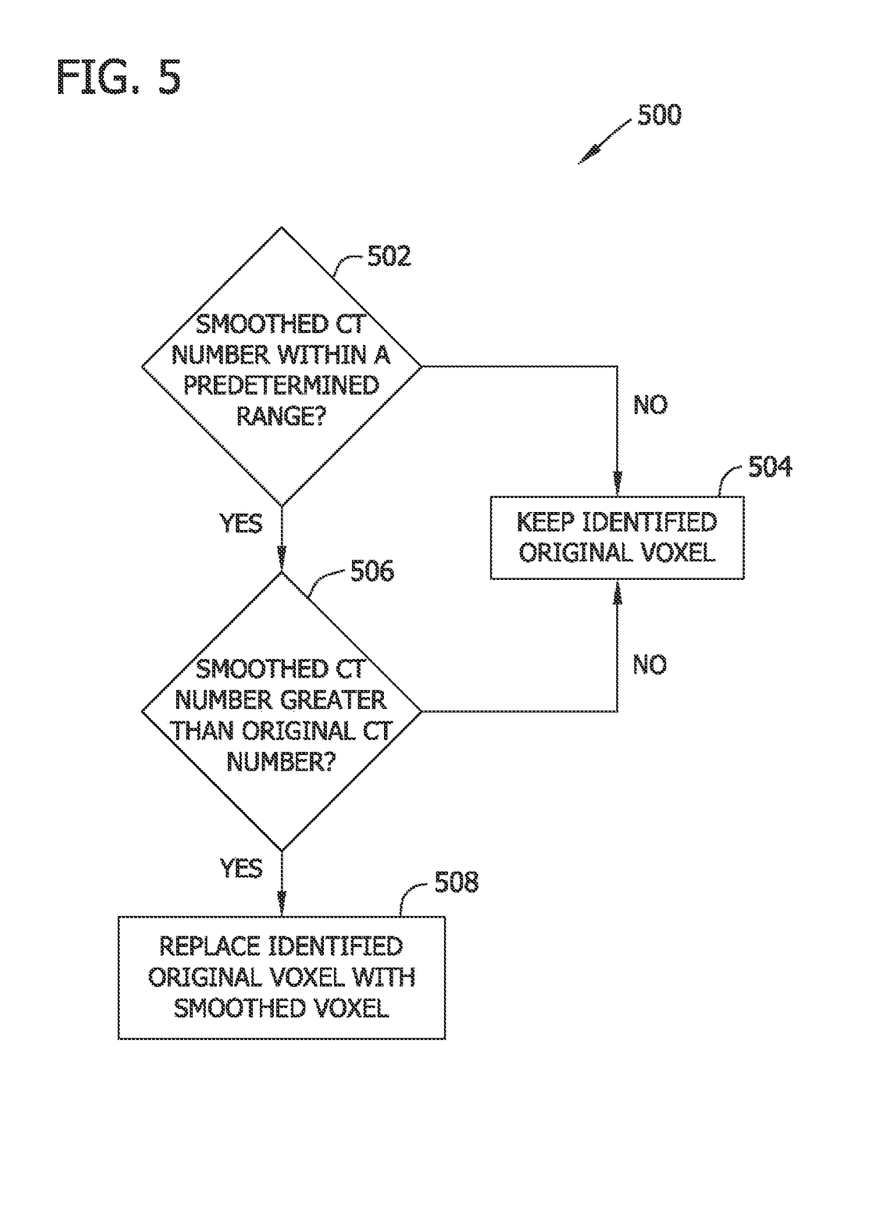
FIG. 5 is a flow diagram of an exemplary method for replacing original voxels with smoothed voxels that may be used with the method shown in FIG. 4.

FIG. 5 is flow diagram of an exemplary method 500 for replacing original voxels with smoothed voxels that may be used with method 400 to generate 408 smoothed image data (both shown in FIG. 4). In the exemplary embodiment, a processing device, such as processor 314 (shown in FIG. 3), performs method 500 for each smoothed voxel obtained by smoothing 406 the CT number of each identified original voxel.

The processing device determines 502 whether the smoothed CT number of the smoothed voxel is within a predetermined range of smoothed CT numbers. In the exemplary embodiment, the predetermined range of smoothed CT numbers in determination 502 is the same as the predetermined range of CT numbers in identification 404 (shown in FIG. 4). Alternatively, the predetermined range of smoothed CT numbers in determination 502 may be different from the predetermined range of CT numbers in identification 404.

If the smoothed CT number is not within the predetermined range of smoothed CT numbers, the identified original voxel associated with the smoothed voxel is kept 504 in the smoothed image data. That is, between the image data and the smoothed image data, the identified original voxel is not replaced.

If the smoothed CT number is within the predetermined range of smoothed CT numbers, the processing device determines 506 whether the smoothed CT number of the smoothed voxel is greater than the CT number of the associated identified original voxel. If the smoothed CT number is less than the original CT number of the identified original voxel, the identified original voxel is kept 504 in the smoothed image data. However, if the smoothed CT number is greater than the original CT number of the identified original voxel, the identified original voxel is replaced 508 with the associated smoothed voxel. Accordingly, in the exemplary embodiment, when generating 408 the smoothed image data, the processing device replaces identified original voxels with smoothed voxels when the smoothed CT number of a smoothed voxel is within a predetermined range of smoothed CT numbers and greater than the original CT number of the associated identified original voxel. Generating 408 the smoothed image data as described herein reduces noise and improves segmentation of an image of the object.

The embodiments described herein enable imaging of thin objects. Original image data of an object, such as a piece of luggage or a package, is acquired. The original image data includes a plurality of original voxels. At least some of the original voxels are smoothed in an x-y plane to generate a set of corresponding smoothed voxels. To generate smoothed image data, at least some of the original voxels are replaced with the smoothed voxels. By smoothing and replacing original voxels, noise in the image data may be reduced and segmentation of the image of the object may be improved. The smoothed image data may be analyzed and/or displayed to determine whether the imaged object includes any contraband, such as explosives, narcotics, and/or weapons.

A technical effect of the systems and methods described herein includes at least one of: (a) acquiring image data of an object, wherein the image data includes a plurality of original voxels; (b) identifying a subset of the original voxels in the image data based on at least one of an original CT number and a location of each original voxel; (c) applying an anisotropic smoothing filter to the identified original voxels in the subset to generate a set of smoothed voxels each having a smoothed CT number; (d) generating smoothed image data by combining the original voxels and the smoothed voxels; and (e) analyzing the smoothed image data to determine whether the object contains contraband.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and nonremovable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems for imaging an object are described above in detail. The methods and systems are not limited to the specific embodiments described herein, but rather, components of systems and/or steps of the methods may be utilized independently and separately from other components and/or steps described herein. Accordingly, the exemplary embodiment can be implemented and utilized in connection with many other applications not specifically described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for imaging an object, said method comprising:
    acquiring image data of the object as the object moves through an imaging system in a first direction, wherein the image data includes a plurality of original voxels each having an original CT number;
    identifying, using a processing device, a subset of the original voxels based on at least one of an original CT number and a location of each original voxel;
    applying, using the processing device, an anisotropic smoothing filter to the identified original voxels in the subset to generate a set of smoothed voxels each having a smoothed CT number, wherein applying an anisotropic smoothing filter comprises smoothing the original CT number of each identified original voxel based on the original CT numbers of a set of original voxels in the same x-y plane as the identified original voxel, wherein the x-y plane is orthogonal to the first direction such that the smoothing is performed in a plane that has a predetermined orientation that is not dependent on characteristics of the plurality of original voxels;
    generating, using the processing device, smoothed image data by combining the original voxels and the smoothed voxels, wherein generating smoothed image data comprises replacing each identified original voxel in the image data with the associated smoothed voxel when the smoothed CT number of the smoothed voxel is within a predetermined range of smoothed CT numbers and greater than an original CT number of the identified original voxel; and
    analyzing the smoothed image data to determine whether the object contains contraband.

2. A method in accordance with claim 1, wherein applying an anisotropic smoothing filter comprises applying an anisotropic smoothing filter such that features extending substantially in the x-y plane are preserved, and features that do not extend substantially in the x-y plane are removed.

3. A method in accordance with claim 1, wherein identifying a subset of the original voxels comprises identifying a subset of the original voxels based on whether the original voxels are located on at least one of a leading edge and a trailing edge of the object.

4. A method in accordance with claim 1, wherein identifying a subset of the original voxels comprises identifying a subset of the original voxels based on whether the original voxels have an original CT number within a predetermined range of original CT numbers.

5. A method in accordance with claim 1, wherein smoothing the CT number of each identified original voxel comprises calculating the smoothed CT number as the mean original CT number of the set of original voxels.

6. A method in accordance with claim 1, wherein smoothing the CT number of each identified original voxel comprises calculating the smoothed CT number by multiplying one of a mean CT number, a median CT number, and a mode CT number of the set of original voxels by a constant greater than 1.

7. A security scanner for imaging an object, the security scanner comprising:
   an X-ray emitter configured to emit X-ray beams that pass through the object as the object moves through said security scanner in a first direction;
   a detector array configured to acquire raw data by detecting the X-ray beams emitted by said X-ray emitter;
   an image reconstructor configured to generate image data of the object from the raw data, the image data including a plurality of original voxels; and
   a processing device configured to:
      identify a subset of the original voxels in the image data based on at least one of an original CT number and a location of each original voxel;
      apply an anisotropic smoothing filter to the identified original voxels in the subset to generate a set of smoothed voxels each having a smoothed CT number, wherein to apply an anisotropic smoothing filter, said processing device is configured to smooth the original CT number of each identified original voxel based on the original CT numbers of a set of original voxels in the same x-y plane as the identified original voxel, wherein the x-y plane is orthogonal to the first direction such that the smoothing is performed in a plane that has a predetermined orientation that is not dependent on characteristics of the plurality of original voxels; and
      generate smoothed image data by combining the original voxels and the smoothed voxels, wherein generating smoothed image data comprises replacing each identified original voxel in the image data with the associated smoothed voxel when the smoothed CT number of the smoothed voxel is within a predetermined range of smoothed CT numbers and greater than an original CT number of the identified original voxels.

8. A security scanner in accordance with claim 7, wherein to apply an anisotropic smoothing filter, said processing device is configured to apply an anisotropic smoothing filter such that features extending substantially in the x-y plane are preserved, and features that do not extend substantially, in the x-y plane are removed.

9. A security scanner in accordance with claim 7, wherein to identify a subset of the original voxels, said processing device is configured to identify a subset of the original voxels based on whether the original voxels are located on at least one of a leading edge and a trailing edge of the object.

10. A security scanner in accordance with claim 7, wherein to identify a subset of the original voxels, said processing device is configured to identify a subset of the original voxels based on whether the original voxels have an original CT number within a predetermined range of original CT numbers.

11. A security scanner in accordance with claim 7, wherein said processing device is further configured to analyze the smoothed image data to determine whether the object contains contraband.

12. A processing device configured to:
   receive image data of an object as the object moves through an imaging system in a first direction, wherein the image data includes a plurality of original voxels;
   identify a subset of the original voxels in the image data based on at least one of an original CT number and a location of each original voxel;
   apply an anisotropic smoothing filter to the identified original voxels in the subset to generate a set of smoothed voxels each having a smoothed CT number, wherein to apply an anisotropic smoothing filter, said processing device is configured to smooth the original CT number of each identified original voxel based on the original CT numbers of a set of original voxels in the same x-y plane as the identified original voxel, wherein the x-y plane is orthogonal to the first direction such that the smoothing is performed in a plane that has a predetermined orientation that is not dependent on characteristics of the plurality of original voxels;
   generate smoothed image data by combining the original voxels and the smoothed voxels, wherein generating smoothed image data comprises replacing each identified original voxel in the image data with the associated smoothed voxel when the smoothed CT number of the smoothed voxel is within a predetermined range of smoothed CT numbers and greater than an original CT number of the identified original voxel; and
   analyze the smoothed image data to determine whether the object contains contraband.

13. A processing device in accordance with claim 12, wherein to identify a subset of the original voxels, said processing device is configured to identify a subset of the original voxels based on whether the original voxels are in a region of the object selected by a user.

14. A processing device in accordance with claim 12, wherein to apply an anisotropic smoothing filter, said processing device is configured to apply an anisotropic smoothing filter such that features extending substantially in the x-y plane are preserved, and features that do not extend substantially in the x-y plane are removed.

* * * * *